United States Patent [19]

West et al.

[11] 4,213,408
[45] Jul. 22, 1980

[54] COMBINATION RIPPER, MIXER AND PLANTER

[75] Inventors: Wilbur C. West; James E. Atkinson, both of Pine Bluff, Ark.

[73] Assignee: W. & A. Manufacturing Co., Inc., Pine Bluff, Ark.

[21] Appl. No.: 923,257

[22] Filed: Jul. 7, 1978

[51] Int. Cl.³ .......................... A01C 5/06; A01B 13/02
[52] U.S. Cl. .................................. 111/85; 111/52; 111/81; 172/156; 172/176; 172/196; 172/540
[58] Field of Search .............. 111/85, 83, 81, 52, 111/1; 172/196, 200, 551, 554, 555, 556, 642, 540, 548, 557, 177, 156, 176

[56] References Cited

U.S. PATENT DOCUMENTS

| | | | |
|---|---|---|---|
| 803,088 | 10/1905 | Barker | 172/556 |
| 2,243,241 | 5/1941 | Burns | 172/556 |
| 3,170,421 | 2/1965 | Norris et al. | 111/1 |
| 3,173,498 | 3/1965 | Heilburn | 172/540 |
| 3,200,778 | 8/1965 | Whelchel | 111/85 |
| 3,220,370 | 11/1965 | Smith | 111/83 X |
| 3,398,707 | 8/1968 | McClenny | 111/1 X |
| 3,456,607 | 7/1969 | West | 111/85 |
| 3,692,120 | 9/1972 | Cline | 172/540 X |
| 4,048,927 | 9/1977 | Mallek et al. | 110/208 |
| 4,048,929 | 9/1977 | Zumbahlen | 111/85 |
| 4,055,126 | 10/1977 | Brown et al. | 111/1 X |
| 4,057,112 | 11/1977 | Taylor | 172/166 |
| 4,088,083 | 5/1978 | Dail, Jr. et al. | 111/85 X |

FOREIGN PATENT DOCUMENTS

| | | | |
|---|---|---|---|
| 78779 | 7/1962 | France | 111/85 |
| 2330296 | 6/1977 | France | 111/85 |
| 788250 | 12/1957 | United Kingdom | 172/555 |
| 864109 | 3/1961 | United Kingdom | 111/85 |
| 129883 | 10/1959 | U.S.S.R. | 111/85 |
| 190681 | 2/1967 | U.S.S.R. | 172/177 |

OTHER PUBLICATIONS

The Subsoiler/Bedder/Planter Profit Maker, p. 6, ad in Implement & Tractor, 1/78, Cole Manufacturing Co. Lely Rowripper Advertisement.

Primary Examiner—Edgar S. Burr
Assistant Examiner—Steven A. Bratlie
Attorney, Agent, or Firm—Clarence A. O'Brien; Harvey B. Jacobson

[57] ABSTRACT

An agricultural implement is disclosed which is adapted to perform soil ripping, mixing, and seed planting behind a single prime mover. Soil ripping is accomplished by a parabolic pointed shank attached to a frame by a pivot bolt and secured by a shear bolt to provide release in the event that an essentially immovable object is struck. Attached to the same framework behind the shank is a pair of mixer wheels for tilling the furrowed soil, and attached behind the mixer wheels is a press pan for smoothing the soil into a seed bed, followed by a seed planter of conventional construction connected to a rear planter bar supported by gauge wheels.

6 Claims, 10 Drawing Figures

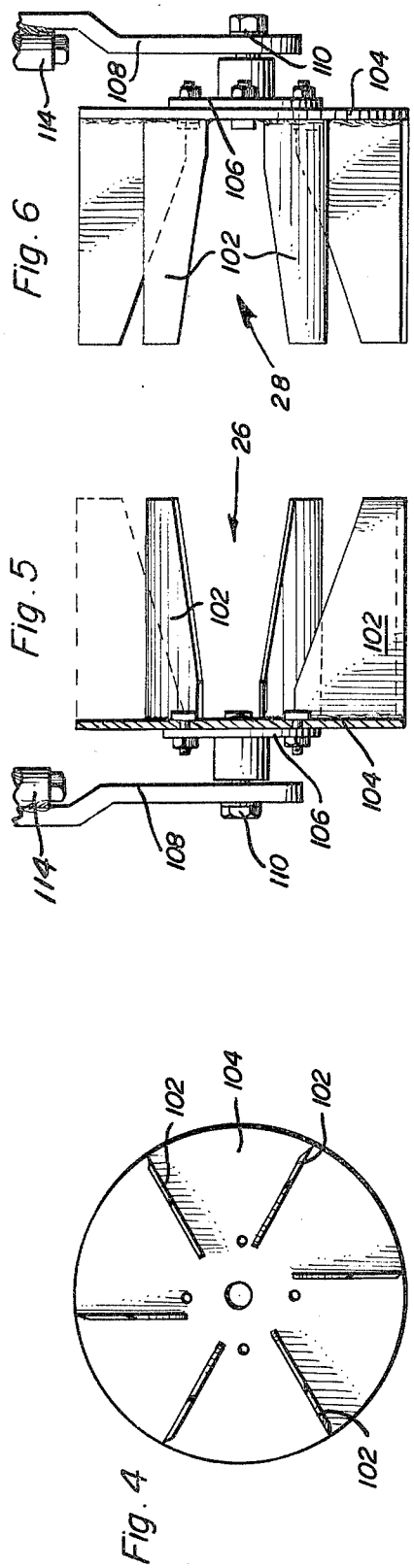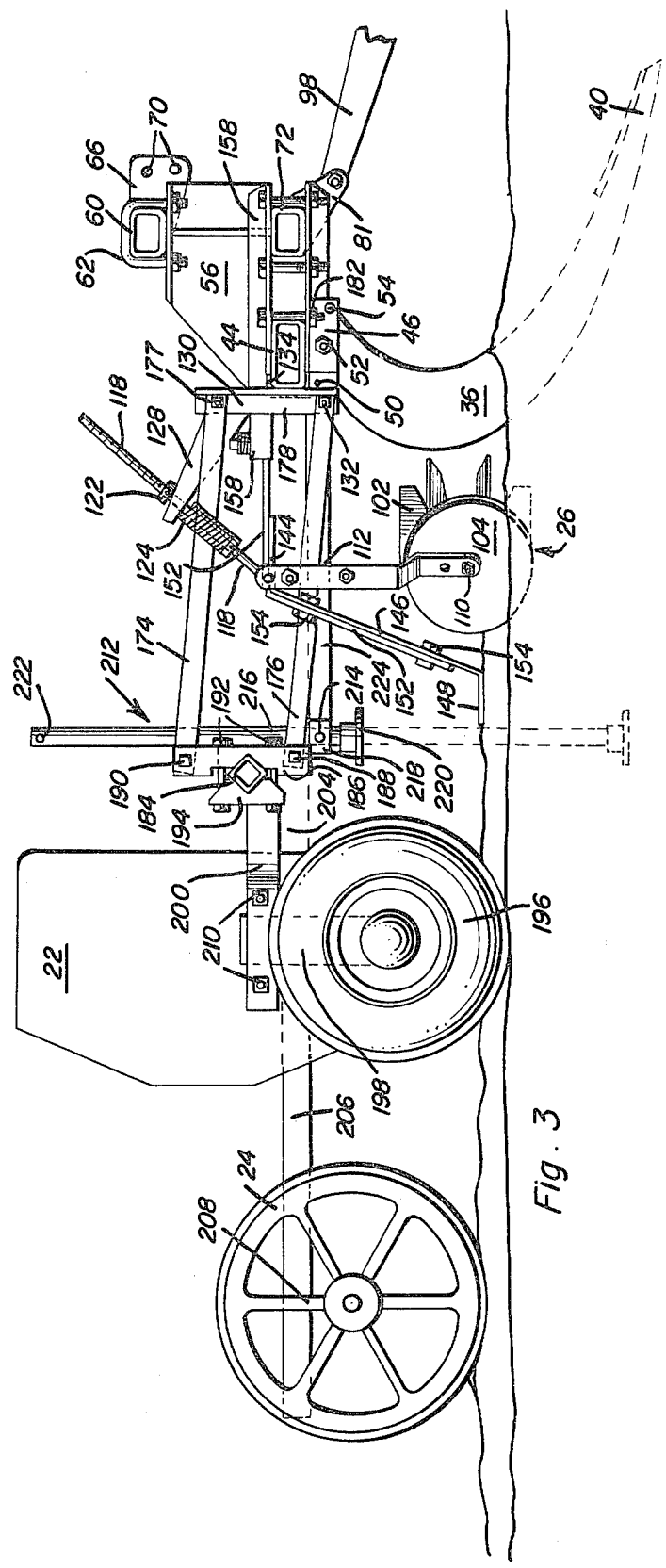

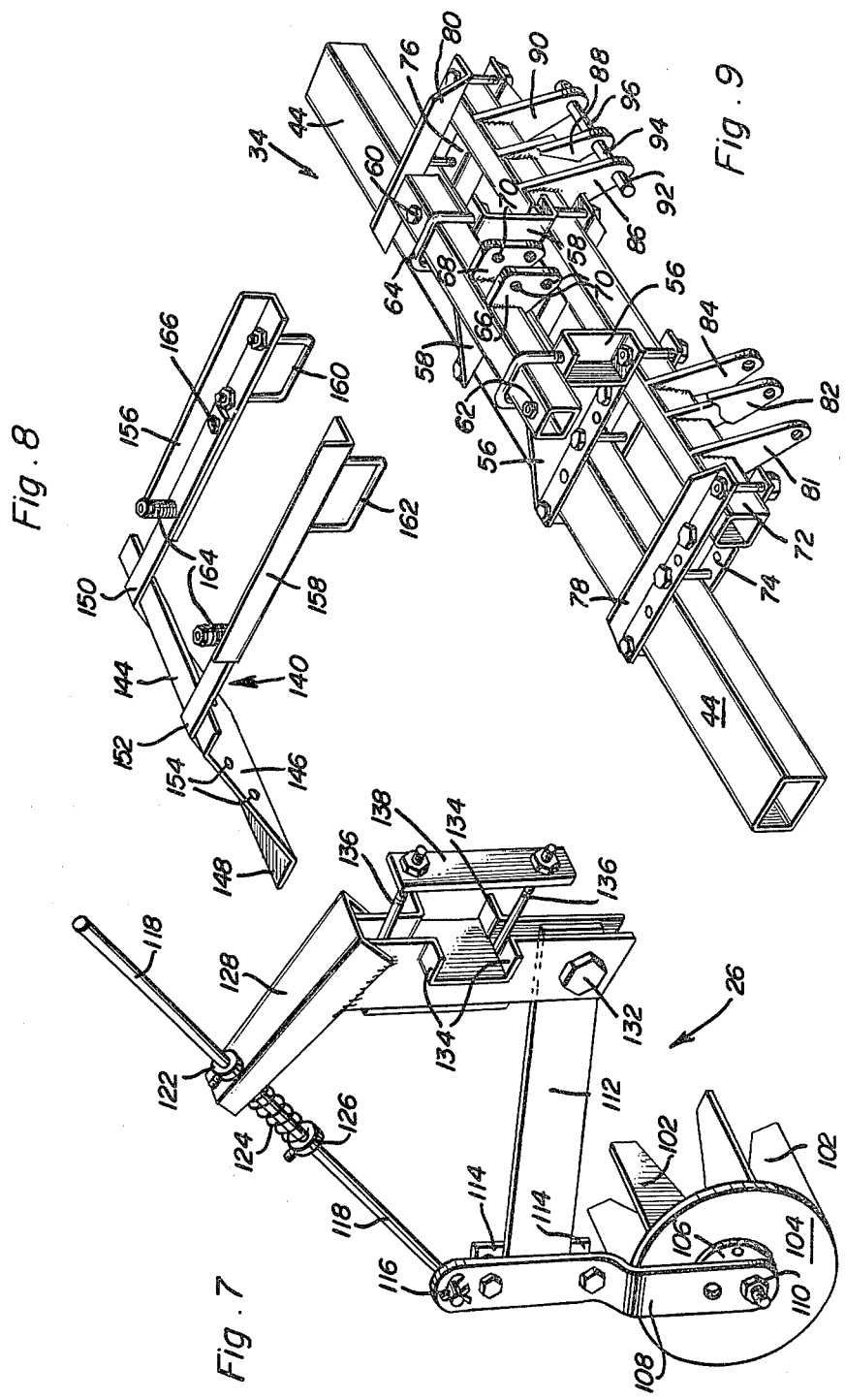

COMBINATION RIPPER, MIXER AND PLANTER

BACKGROUND OF THE INVENTION

1. Field of the Invention

The invention relates to an agricultural implement to accomplish a plurality of operations upon soil, including breaking or ripping of the soil, mixing of the soil and planting of seed in the worked soil. More particularly, soil breaking or ripping is accomplished by a pointed parabolic shank pivotably attached by a shear bolt to a supporting framework. Following the shank and also attached to the framework is a pair of mixer wheels comprising a plurality of blades extending outwardly from a wheel disk, but offset slightly from the radial direction. Following mixing by the mixer wheel, a press pan smooths and levels the broken soil to form a seed bed, into which a conventional planter and seed press wheel deposit and cover rows of seed.

2. Description of the Prior Art

Agricultural devices are known for accomplishing various operations, such as furrowing, fertilizing, cultivating, planting, and the like. For example, U.S. Pat. No. 3,398,707 to McClenny, issued Aug. 27, 1968, shows a device for working, treating and planting soil on a single pass, where a main frame is pulled by a tractor and on which are mounted from front to back, a plurality of plows, fertilizing equipment and a rotary cultivator. A drive system on the frame has a connection to the power take-off shaft of the tractor, requiring delivery of power and consumption of energy for operating the device. Furthermore, the furrow forming shank appears to be rigidly mounted and will not trip when an obstruction, such as a large rock or submerged tree stump, is encountered during use. Moreover, the McClenny soil working unit has a single non-adjustable mechanism for each row, with no cooperation between elements to aggressively mix soil and maximize shedding of trash, vegetable matter, or the like.

U.S. Pat. No. 4,048,929, issued Sept. 20, 1977, to Zumbahlen, discloses a pole-type planter trailed behind rotary pulverizing wheels, and also has a single sequence of non-adjustable components for each row to be planted. The Zumbahlen machine fails to disclose a subsoiling shank which plows sufficiently deep to shatter subsoil known in the art as "hardpan". Consequently, a need exists to overcome the shortcomings inherent in machines of this type. Other patents illustrating the state of the art including the following:

U.S. Pat. No. 2,362,728 - Nov. 14, 1944 - H. P. Smith
U.S. Pat. No. 2,569,464 - Oct. 2, 1951 - R. Edwards, et al.
U.S. Pat. No. 2,593,341 - Apr. 15, 1952 - R. L. Phipps
U.S. Pat. No. 3,490,541 - Jan. 20, 1970 - W. J. Adams, Jr.
U.S. Pat. No. 3,692,120 - Sep. 19, 1972 - T. L. Cline
U.S. Pat. No. 3,782,481 - Jan. 1, 1974 - S. H. Quanbeck.

SUMMARY OF THE INVENTION

A device for combining several agricultural operations used particularly in planting of cotton, soybean, corn and similar crops planted in rows spaced approximately 30 to 44 inches apart. Parabolic shanks for each row perform a furrowing operation by penetration into deep subsoil, the shank being mounted on a frame by a pivot bolt and a shear bolt, this arrangement permitting the shank to rotate backward without doing permanent damage to the machine if a large obstruction causes the shear bolt to shear. Mixer wheels mounted on the frame behind the shanks pulverize and aggressively mix the soil and form a small raised seed bed, which a following press pan presses down to provide a firm smooth seed bed. The mixing wheels are arranged in pairs and spaced apart to permit a shank to pass between them without damaging the unit when the shank is pivoted rearwardly after the shear bolt has been sheared. A conventional planter is attached to the rear of the frame by parallel linkages which support a rear tool or planter bar and gauge wheels, and all operations are performed in combination simultaneously. The device is most conveniently connected to a prime mover by means of a three-point hitch, and can be adapted to plant a plurality of rows, such as two, four or six. In addition, pesticide or fertilizer can be sprayed or otherwise applied in front of the mixing wheels, which incorporate any such ingredients into the seed bed. The entire furrowing, mixing, and planting operations are ground driven, requiring no separate powering from the tractor or other prime mover. Complexity of operation is thereby avoided, reducing maintenance requirements and fuel consumption. Moreover, adjustment of the planter device is possible by means of a parallel action linkage for correct positioning of gauge wheels associated with a planter of conventional construction.

Accordingly, it is an object of the present invention to provide an agricultural implement to accomplish a combination of operations, including furrowing, mixing, smoothing and planting.

Another object of the invention is to provide an agricultural implement with a parabolic shank secured by a pivot bolt and a shear bolt, the shear bolt being adapted to shear if the shank hits an obstruction, such as a large rock or submerged tree stump, thereby avoiding permanent damage to the machine.

Still another object of the invention is to provide a mixer assembly to aggressively mix and pulverize the soil, yet permitting a sheared shank to pivot therebetween without damaging the implement.

Yet another object of the invention is to provide and adjustable mechanism for connecting gauge wheels for correct positioning of the planter, and for allowing the planters to follow the contour of the land.

Another further object of the invention is to provide a parking stand for the implement for use when not connected to a prime mover.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view of the device.

FIG. 4 is a side elevational view in the axial direction of a mixer wheel, in the direction of the mounting plate, showing details of blade mounting.

FIGS. 5 and 6 are side elevational views of a pair of mixer wheels mounted on mixer wheel arms offset slightly to the inside. When mounted to form the device of the present invention, the axes of the mixer wheels shown in FIGS. 5 and 6 will not coincide, but will form a slight angle, as is apparent from FIG. 1.

FIG. 7 is a perspective view of a mixer wheel and associated mounting components.

FIG. 8 is a perspective view of the smoother pan assembly of the present invention and associated mounting components.

FIG. 9 is a perspective view of the frame mounting assembly for the shank of the present invention and for attachment to a prime mover.

DESCRIPTION OF THE PREFERRED EMBODIMENT

Figure 1:
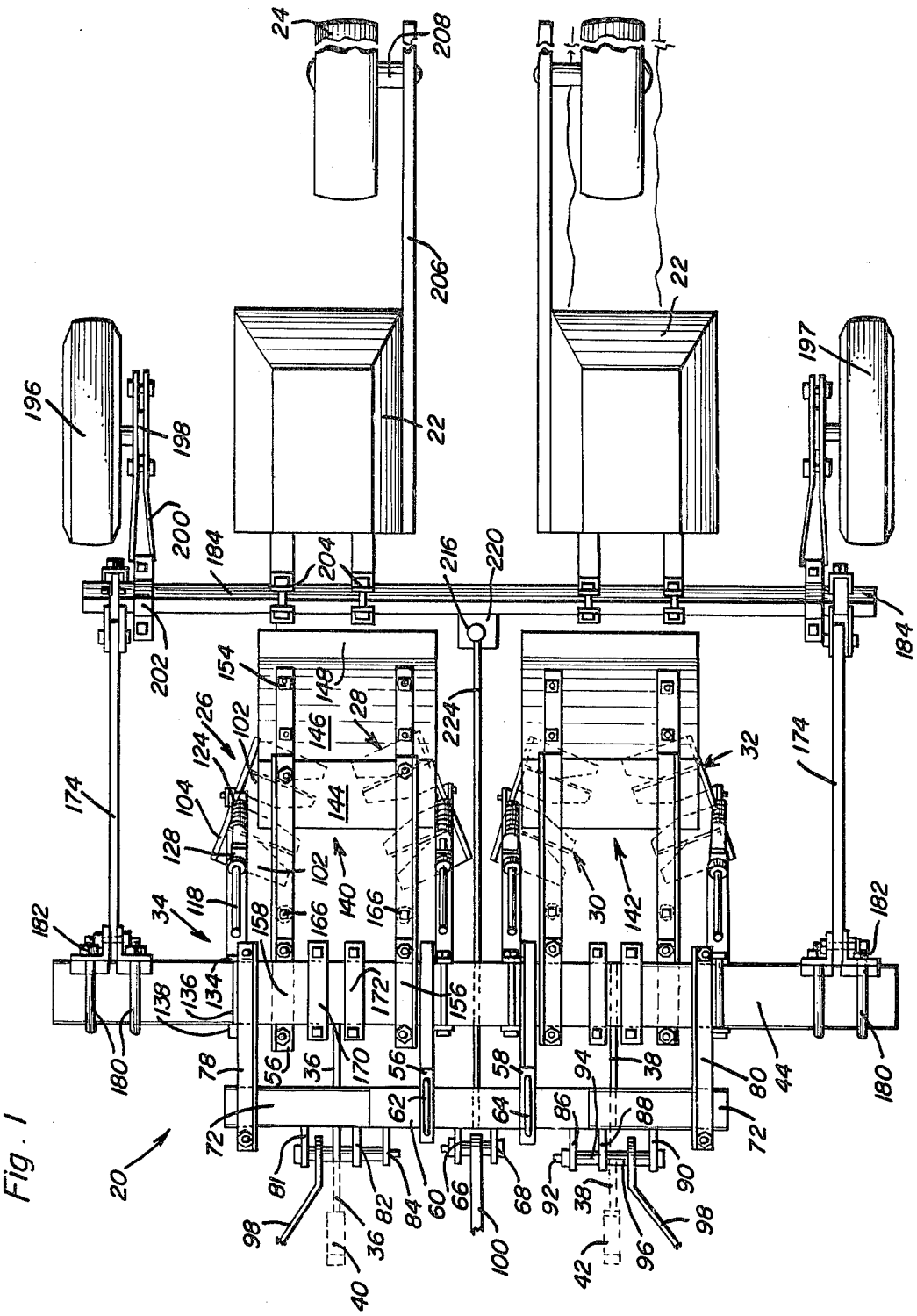
FIG. 1 is a top plan view of the device of the present invention.

In FIG. 1, the combination ripper, mixer, and planter device is designated generally by the numeral 20, and comprises planter unit 22, with associated seed press wheel 24; mixer wheels 26, 28, 30 and 32; and a shank mounting assembly designated generally by the numeral 34. Two shanks 36 and 38, of generally parabolic shape, are shown, each shank being followed by a pair of mixer wheels and a planter. For example, shank 36 is followed by mixer wheels 26 and 28, and by planter 22 with associated seed press wheel 24. Each shank 36 and 38 is provided with a replaceable point 40 and 42, respectively, for contacting the soil. Shank 36 is mounted upon rectangular cross bar 44 by angle clamp arms 46 and 48, by means of rearward pivot bolt 50 and forward shear bolt 52.

Bolt 54 which does not go through shank 36, maintains angle clamp arm 46 fixed in the event that shank 36 shears at shear bolt 52, such as occurs when point 40 encounters an essentially immovable object, such as a large rock, submerged tree stump, or the like. If such an obstruction is hit by point 40, shear bolt 52, which could, for example, be a ⅜" grade 2 bolt will shear, and shank 36 rotate backwardly around the larger bolt 50, for example a ¾" grade 5 bolt, without damaging permanently the supporting framework or other components of the device. After clearing the obstruction, shank 36 can be repositioned and another ⅜" shear bolt 52 installed, restoring the unit to its original operative condition. Mixer wheels 26 and 28 are so located that backward movement of shank 36 goes therebetween without contact or damage.

A pair of gusseted, forwardly extending clamp brackets 56 and 58 are attached to cross bar 44 and support square hitch bar 60, held respectively by U-bolts 62 and 64. Tabs 66 and 68 are provided with holes 70 adapted for receiving a clevis pin for attachment to a prime mover, such as a three-point hitch or a tractor (not shown). The brackets 56 and 58 are bolted to cross bar 44 and support square pull bar 72. Additional support between pull bar 72 and cross bar 44 is provided by clamp brackets 74 and 76, which include right angle members 78 and 80. Pull bar 72 provides the two lower points of connection to the three-point hitch of a prime mover, comprising, along with the connection through tabs 66 and 68, the three-point hitch arrangement which constitutes a closecoupled driving arrangement. Tabs 81, 82, and 84 are welded on pull bar 72, and the symmetrically arranged opposite counterparts tabs 86, 88 and 90 are shown with a hitch pin 92 and bushings 94 and 96 for connection to lower arms 98, which transmits pulling force from the prime mover (not shown), such as a tractor. Upper arm 100 also transmits pulling force through tabs 66 and 68 with the upper and lower arms forming a portion of a conventional three-point hitch. An isolated view of the three-point hitch assembly is shown in FIG. 9.

Figure 2:
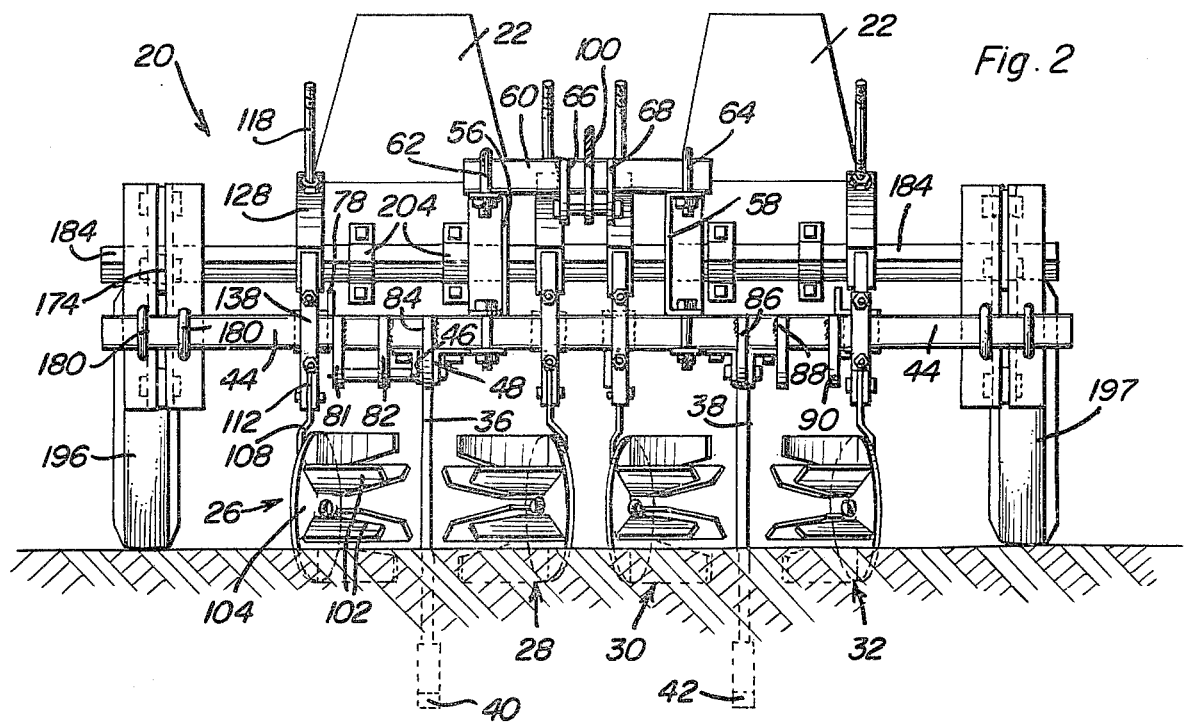
FIG. 2 is a front elevational view of the device.
Figure 10:
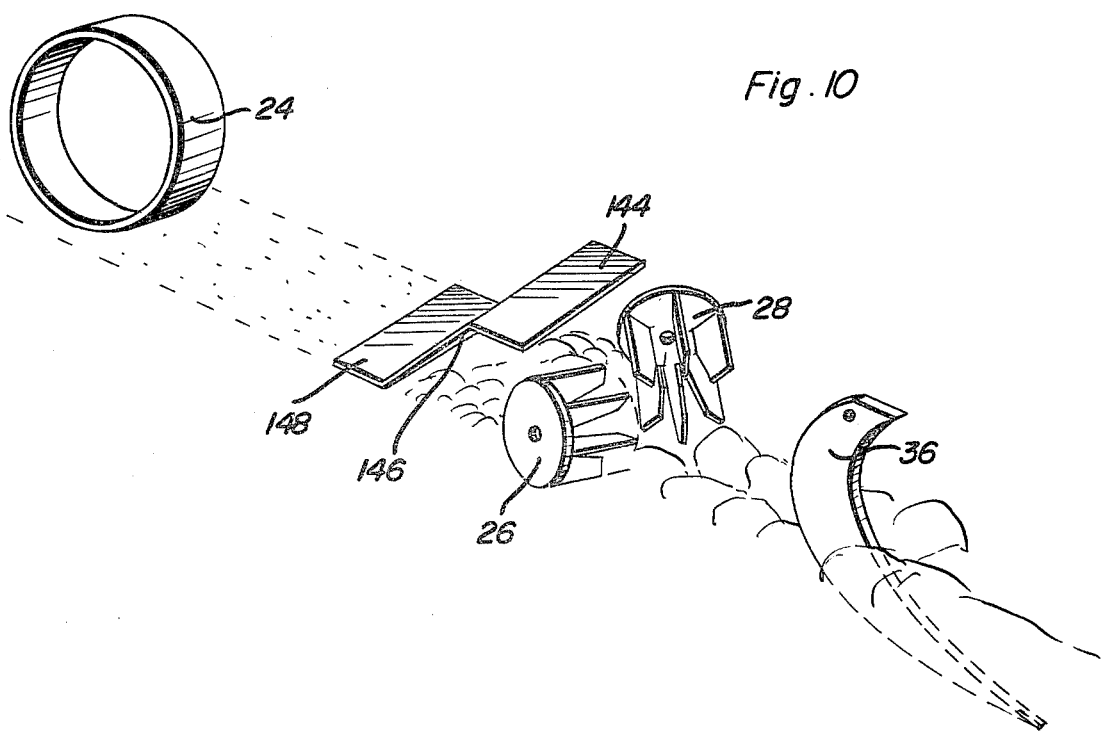
FIG. 10 is a group perspective view of the shank, mixer wheels, smoother pan and seed press wheel, showing the order of assembly of each of these components, as well as the texture and condition of soil following action of each component.

Other components are also mounted on shank mounting cross bar 44. Mixer wheel 26 is mounted on cross bar 44 by the mechanism most easily observed in FIGS. 7 and 3. Mixer wheel 26 comprises blades 102 mounted by welding or otherwise to circular disk 104 having hub 106. Preferably, blades 102 are notched so that when assembled to form wheel 26, as shown in FIG. 5, or wheel 28 as shown in FIG. 6, the inner blade edges fall substantially upon the frustum of an imaginary cone opening outwardly from and centered about a line perpendicular to the center of the disk 104. Suitable bearing means allow rotation of mixer wheel 26 at the end of mixer wheel arm 108 through rotation about bolt 110. It is to be noted that mixer wheel arm 108 is offset in the embodiment illustrated in FIGS. 3, 5 and 2 so as to place mixer wheel 26 slightly to the inside. Alternatively, offset to the outside is possible, as illustrated in the embodiment shown in FIG. 7, and adjustment is possible in use to change the separation between mixer wheels. Mixer wheel arm 108 is supported upon support member 112 by bolting of backing plate 114, and by connection at its upper end through hook 116 of adjusting rod 118, which permits adjustment of the orientation of mixer wheel 26 by extension along its length, as controlled by retainer collar 122 and spring 124 resiliently acting between retainer collar 126 and channel bracket 128, which is welded to main bracket 130. Support member 112 is pivoted to the lower end of bracket 130 by a suitable pivot bolt 132. Main bracket 130 is adapted through wings 134 to fit the rearward edge of mounting cross bar 44, and bolts 136, acting cooperatively with backing strip 138, secure main bracket 130 to cross bar 44. This structure enables adjustment of the mixer wheel and also enables the mixer wheel to raise by compressing spring 124 in order to roll over a rock or the like.

Press pans 140 and 142 are constructed and mounted as shown in FIG. 8 on cross bar 44. Press pan 140 has a top horizontal wing portion 144, a backwardly sloping center portion 146, which is located above the mixer wheels, and a lower trailing edge 148 which contacts the soil in a pressing and smoothing operation. Press pan 140 is mounted on support brackets 150 and 152 by bolts 154. Angle brackets 156 and 158 are rigidly mounted on cross bar 44 by U-bolts 160 and 162, and hold support brackets 150 and 152 by means of bolt and spring assemblies 164 and bolt connections 166. These mounts permit resilient limited flexing of support brackets 150 and 152 upwardly, and maintain a firm downward force on press pan 140 as trailing edge 148 smooths and presses soil tilled by mixer wheels 26 and 28 during operation of the device. Each bolt and spring assembly 164 comprises a spring, lock nut, and flat washer on a suitable bolt. Press pan 140 can be adjusted forward or back by relocating the bolts of spring connection 164 and bolt connection 166. Press pan 140 can be adjusted up or down by relocating the bolts 154.

Shank 36 is mounted upon cross bar 44 by brackets most easily seen in FIGS. 3 and 1. The bottom mounting angle clamp arm 46, fastened to shank 36 by shear bolt 52 and pivot bolt 50, is attached to cross bar 44 by bolting to top mounting brackets 170 and 172. Shank 36 is attached to cross bar 44 with a slight offset from the center of the desired row spacing, preferably about two to four inches.

Cross bar 44 is most preferably constructed of rectangular shape, with the larger dimension in the horizontal direction. Other cross bars forming part of the invention can conveniently be made of smaller size and square cross section, since these cross bars do not ordinarily carry the magnitude of the load on cross bar 44.

Parallel linkages on each side of the unit are connected to cross bar 44, each comprising a top arm 174 and a bottom arm 176. Each arm is pivotally connected by bolts 177 to front brackets 178, held to cross arm 44 by U-bolts 180 and associated nuts 182. Rear planter bar 184 is attached to the parallel linkage by rear bracket 186, bolted to bottom arm 176 by pivot bolt 188 and to top arm 174 by pivot bolt 190. Rear bracket 186 is attached by bolts 192 and by backing clamp 194 to rear planter bar 184, shown as diamond-shaped in FIGS. 3, 2, and 1. Alternatively, a flat bar of square cross section appearance can be used. Planter bar 184 supports gauge wheels 196 and 197 as well as planters 22 and seed press wheels 24. Gauge wheel 196 is mounted on arm 198 with a welded spindle and hub of conventional construction. Arm 198 is bolted to tool bar bracket 200, which is clamped with suitable attaching means 202 to planter bar 184. Gauge wheels 196 and 197 allow planters 22 to follow the contour of the land. Planters 22 are attached to planter bar 184 by suitable clamping devices 204, and support member 206, extending from planter 22, is attached to seed press wheel 24 by suitable connecting means 208. Seed press wheel 24 is in alignment with seed deposited from planter 22 and firms the soil following seed deposition. Adjustment of the position of gauge wheel 196 is made by loosening bolts 210 on tool bar bracket 200 and sliding arm 198 upwardly or downwardly to raise or lower gauge wheel 196 for correct positioning. Various conventional seed planter units may be used and attached to the rear tool bar 184 with such planters including the usual planting shoe, fertilizer attachment and seed press wheels or other standard components.

When the device 20 is connected to a tractor for operation, a parking stand is not required, and rear pipe stand 212 is raised and held in an upward position by pin 214 in a bottom hole through pipe 216. When device 20 is to be disconnected from a tractor, pin 214 is pulled, pipe 216 slides down through slide bracket 218, ground plate 220 rests on the surface of the ground, and pin 214 is reinserted into top hole 222. Slide bracket 218 is welded or otherwise connected to pipe stand support bar 224, which passes beneath cross bar 44 and is attached to pull bar 72 by a top mounting plate and bolting means (not shown). When pipe stand 212 is in use, and device 20 is not connected to a tractor, the device is then supported by pipe stand 212 at the rear of the unit and by point 40 on shanks 36 and 38 at the front. It is understood that in FIG. 3, in such "parked" position, the ground level will be at a level connecting ground plate 220 (shown in phantom) with points 40 and 42, rather than the ground level shown in FIG. 3 for the device when in operation.

To assemble device 20 from its various subassemblies, the shank assembly or assemblies are first mounted on cross bar 44 with an offset of a few inches from the center of the desired row spacing. Next, mixer wheel assemblies, such as illustrated in FIG. 7, are mounted on cross bar 44 to leave a clearance between the tips of the mixer wheels sufficient to permit passage of shank 36 if tripped by an obstruction with shearing of shear bolt 52 in the manner described above. Next, the press pan assembly, as illustrated in FIG. 8 is installed, followed by the three-point hitch assembly of FIG. 9. Parallel connecting brackets 174 and 176 are next connected to cross bar 44, followed by connection of planter bar 184 to the parallel connector arms. Gauge wheels 196 and 197 are next attached at the desired row spacing and correct height. Finally, the parking stand assembly is attached to bar 72, and the planters are attached to planter bar 184.

Many advantages derive from use of the device of the present invention. Combining of many agricultural operations which break the hardpan soil, take advantage of all available moisture, prepare and firm the seed bed and plant seeds at the same time insures in row subsoiling for better root development, which results in savings of time, labor and fuel. Moreover, the parabolic design of the furrow forming shank requires less horsepower per row in operation, and provides deep shattering of soil, for example, up to about 20 inches in depth. Mixer wheels of the present invention with open center construction shed trash, pulverize the soil, and then throw it over the ripped area to form a small bed. Combined with pressing and smoothing of the soil by the press pan to give a firm seedbed, the possibility of seed fall-in is reduced, helping to insure a more uniform stand. The parallel linkages and rear bar gauge wheels allow the planters to follow the contour of the land. By mounting the mixer wheel at an angle of about 15° from the direction of travel, it has been found that the mixer wheel is not pulled at right angles to the path of travel, but instead aggressively mixes the soil, with tests showing good incorporation results to a depth of about three inches. Further, on a twelve inch diameter wheel disk 104, an offset of one-half inch has been found suitable to facilitate blades 102 entering the soil said offset therefore constituting about 1/24 the diameter of wheel disc 104.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In an agricultural implement for working and planting soil, said implement having a cross bar adapted for pulling by a prime mover, the improvement comprising, in combination, a parabolic shank trippably pivotably attached to said cross bar, a pair of mixer wheel assemblies behind and on opposite sides of the shank and adjustably and symmetrically attached to said cross bar, a press pan behind the mixer wheels and flexibly attached to said cross bar, and a parallel linkage assembly attached to said cross bar to pull in parallel spaced relationship thereto a planter bar to which planting means is attached, wherein each of said mixer wheel assemblies comprises an open center mixer wheel and adjustable mounting means, said mixer wheel comprising a circular disk and a plurality of generally axially extending planar blades welded to a face of the disk and which do not extend beyond the circumference of the disk, the disk being held at the center of the opposite face by said mounting means with the plane of said disk forming an acute angle with respect to said cross bar to aggressively mix said soil, and said blades generally paralleling and being slightly laterally offset from adjacent radial planes of said disk to facilitate the blades entering said soil and said adjustable mounting means including spring means yieldingly biasing said disks downwardly with sufficient force to enable the lower peripheral portions thereof to penetrate the soil ripped by said shank, whereby said mixer wheels pulverize and aggressively mix the ripped soil and form a small raised seed bed each blade being notched so that the outer end portions of the inner blade edges fall substantially upon the frustum of an imaginary cone opening outwardly from and centered about a line perpendicular to the center of the disk.

2. The combination of claim 1 wherein said adjustable mounting means comprises a substantially vertical slightly offset wheel bracket on which said mixer wheel is selectably mounted and which is held by a mounting bracket fastened on said cross bar by a pivotable arm connected to the mounting bracket, said spring means including an adjustable compression spring biased rod adjustably connecting the upper end of said wheel bracket with said mounting bracket, whereby adjustment is possible in use to change the separation between a pair of said mixer wheels.

3. The combination of claim 2 wherein said parabolic shank is attached to said cross bar by attaching means mounted thereon, a pivot bolt passing through said adjustable means and said shank, a shear bolt passing through said attaching attaching means and said shank in spaced relation to said pivot bolt, said shear bolt being smaller in size and lower in grade than said pivot bolt to permit said shank to trippably shear the shear bolt and pivot backwardly about the pivot bolt upon encounter by the shank of an essentially immovable obstruction.

4. The combination of claim 3 wherein said press pan comprises a metal sheet with a flat trailing edge contacting said soil to press and smooth the soil into a firm seed bed, said sheet being held by support brackets connected by flexible means to an angle bracket fastened to said cross bar.

5. The combination of claim 4 wherein said cross bar is attached to said prime mover by a three-point hitch assembly comprising a pull bar attached in parallel forwardly spaced relationship to said cross bar, a hitch bar mounted above said pull bar by a pair of gusseted, forwardly extending clamp brackets bolted to said pull bar and said cross bar, said pull bar having two locations of connection near the ends thereof whereby it is connected to the prime mover, and said hitch bar having one location of connection near its center whereby it is connected to the prime mover.

6. The combination of claim 5 wherein said planting means comprises a planter, adjustable gauge wheels to enable said planter to follow the contour of said soil, and a seed press wheel, said planter being followingly attached behind said planter bar and said seed press wheel being attached to follow behind said planter.

* * * * *